Oct. 2, 1928.  
C. D. BOUSMAN  
1,686,143
LIME SPREADER
Filed Jan. 18, 1926
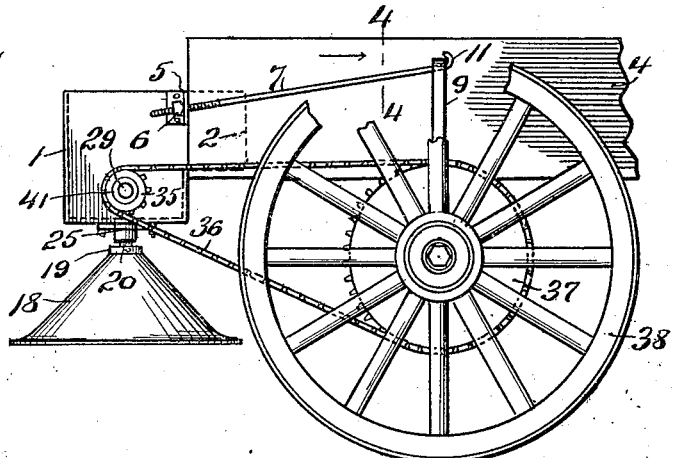
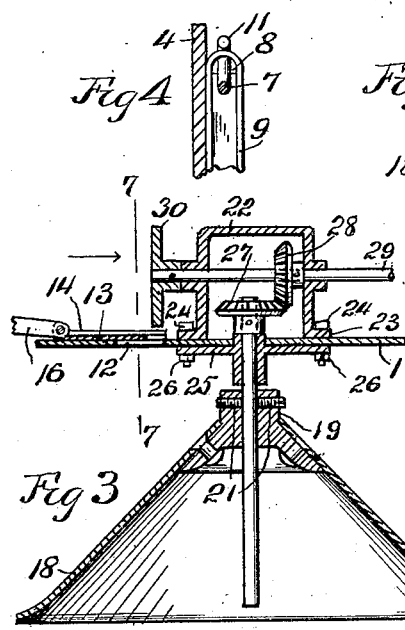
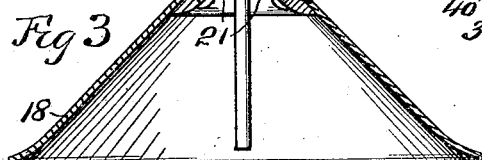
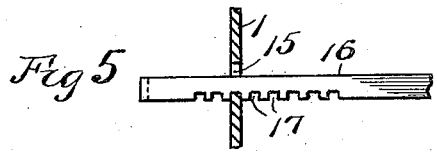
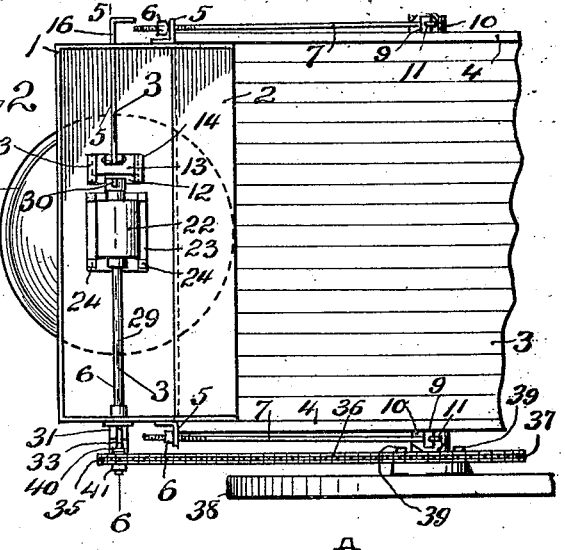
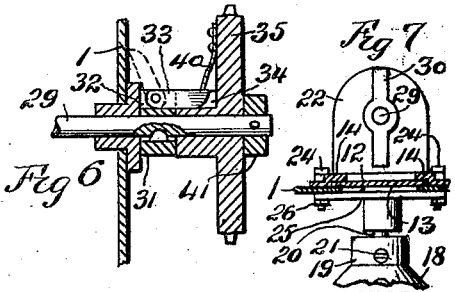
WITNESSES:  
R. C. Hamilton
INVENTOR.  
Claude D. Bousman  
BY Warren N. House  
His ATTORNEY Patented Oct. 2, 1928.

1,686,143

UNITED STATES PATENT OFFICE.

CLAUDE D. BOUSMAN, OF KANSAS CITY, KANSAS.

LIME SPREADER.

Application filed January 18, 1926. Serial No. 82,001.

My invention relates to improvements in lime spreaders. While particularly well adapted for spreading lime or lime stone dust, my improved spreader is adapted for use in spreading over the ground different kinds of fertilizing material or for broadcasting seeds.

My invention relates particularly to the type of spreaders which are attached to the rear ends of wagon beds and which are adapted to be operated by power derived from the wheels of the wagons.

One of the objects of my invention is to provide a spreader of the kind described which is very simple in construction, which is cheap to construct, which is strong, durable, not liable to get out of order, which may be readily and quickly attached to a wagon, and which is efficient in operation.

A further object of my invention is to provide novel means for fastening the hopper to the rear end of the wagon bed.

Still another object of my invention is to provide novel means for adjustably regulating the discharge of the material from the hopper.

My invention provides further a novel spreader member adapted for adjustment as to height from the ground to suit wind conditions, and range of spread.

My invention provides still further a novel simple mechanism for revolving the spreader member and agitating the material which is being discharged from the hopper.

The novel features of my invention are hereinafter fully described and claimed.

In the accompanying drawing, which illustrates the preferred embodiment of my invention, Fig. 1 is a side elevation of my improved spreader shown attached to a wagon which is partly broken away.

Fig. 2 is a top view of the same.

Fig. 3 is an enlarged section on the line 3—3 of Fig. 2.

Fig. 4 is an enlarged section on the line 4—4 of Fig. 1.

Fig. 5 is an enlarged section on the line 5—5 of Fig. 2.

Fig. 6 is an enlarged section on the line 6—6 of Fig. 2.

Fig. 7 is a section on the line 7—7 of Fig. 3.

Similar reference characters designate similar parts in the different views.

1 designates the body of a hopper, which may be of any desired shape, the one shown being of rectangular form, the body having a front mouth portion 2, of less depth than the body 1, and which is adapted to rest upon the bottom 3 of a wagon bed, and to be fitted between the side boards 4 of the bed. The front of the portion 2 is open, so that material to be spread may be shoveled, without lifting, from the bed directly back into the hopper body 1.

For firmly and securely and quickly detachably fastening the hopper body 1 to the rear end of the bed, so that the hopper will be held against the rear ends of the side boards 4 and bottom 3, opposite ends of the body 1 are respectively provided with abutments comprising, preferably angle plates 5 against the rear sides of which respectively bear two nuts 6, which are respectively fitted on the threaded rear ends of two rods 7, which respectively extend through the angle plates 5, and which may be respectively extended through the usual openings 8 in the upper ends of the standards 9, which are mounted in the usual manner on the rear bolster 10 at the outer sides respectively of the side boards 4 of the wagon bed.

Each rod 7 may be provided at its forward end with suitable means for engaging the adjacent standard 9, such means in the form shown being a hook 11.

In fastening the hopper to the bed, the hopper portion 2 is inserted into the rear end of the bed, and the rods 7 are inserted through the holes 8 in the standards 9 and through the angle plates 5. The hooks 11 are engaged with the standards 9 and the nuts 6 are fitted on the rods 7 so as to bear tightly against the rear sides of the angle plates 5, thus holding the hopper firmly and securely against the rear end of the wagon bed.

The bottom of the body 1 of the hopper is provided with a discharge opening 12, Figs. 2, 3 and 7, over which is slidably mounted a flat valve plate 13, which is longitudinally and horizontally adjustable on the bottom of the body 1 between two guide plates 14 secured to the upper side of the bottom of the hopper body 1. The left end of the body 1 has a slot 15 in which is slidable an operating bar 16, the inner end of which is pivoted to the valve plate 13. The under side of the bar 16 has a longitudinal row of notches 17, each of which is adapted to receive that portion of the body 1 which is at the bottom of the slot 15, for releasably holding the bar 16 and valve plate 13 in the positions to which they may be adjusted. By adjusting the bar 16, the amount discharged through the opening 12 may be adjusted to suit the requirements.

For spreading the lime or other material which is discharged from the hopper through the opening 12, I provide suitable spreading means located under the opening 12. In the form of my invention shown, such spreading means comprises a downwardly flaring spreader member 18, preferably conical, the flaring surface of which is under and alined with the opening 12. The member 18 is preferably vertically adjustable so as to suit wind conditions, extent or range of spread and kind of material to be spread. The higher the position of the spreader member 18, the wider will be the range of spread, and the thinner will be the layer spread material, for the same speed of travel and amount of material discharged in a given time.

For vertically adjustably supporting the spreader member 18, it is provided with a hub 19 which is vertically adjustable on a vertically rotary shaft 20 to which it is adapted to be rigidly secured by one or more set screws 21, Figs. 3 and 7.

The hopper is provided with a housing comprising a body 22 mounted on the upper side of the bottom of the body 1 adjacent to the opening 12, the body 22 having a bottom flange 23 through which extend bolts 24, which also extend through the bottom of the body 1 and through a clamping plate 25, which bears against the under side of the bottom of the body 1, and which has bearing against its under side nuts 26 respectively mounted on the bolts 24, Fig. 3.

The plate 25 is provided with a vertical hole in which the shaft 20 is rotatable. Upon the upper end of the shaft 20 in the housing member 22 is fastened a bevel gear 27, which meshes with a bevel gear 28 in the housing 22 and fastened to a horizontal shaft 29, which extends through and is rotatable in the housing body 22, and which also extends through the right end of the hopper body 1, Figs. 1, 2 and 6.

For agitating the material, which is being fed through the opening 12, to assume continuous and even feeding, there is fastened to the inner end of the horizontal shaft 29 an agitator member 30, which has one or more arms adapted in revolving to pass over and close to the opening 12.

For driving the horizontal shaft 29, it has keyed to it, outside the hopper body 1, a collar 31, Fig. 6, to the periphery of which is pivoted, in a longitudinal groove 32, so as to swing from the released dotted position, Fig. 6, to the horizontal locking position shown in solid lines, a locking member 33, which in the horizontal position is adapted to lie in a longitudinal groove 34 provided in the hub of a sprocket wheel 35, which is revoluble on the horizontal shaft 29, and which is connected by a chain belt 36 with a sprocket wheel 37, which is attached in any suitable manner to the adjacent rear carrying wheel 38 of the wagon, as by bolts 39, which engage the hub of the wheel, Fig. 2.

With the various parts mounted, as described, when the wagon is moved forwardly, the shaft 29 will be revolved by means of the wheel 38, sprocket wheel 37, chain belt 36, sprocket wheel 35, locking member 33, and collar 31. For releasably holding the locking member 33 in the groove 34, there may be fastened to the inner side of the wheel 35 a spring plate 40, which normally bears against the outer side of the member 33. To release the locking member so that it may be swung to the dotted position in Fig. 6, so that the spreader mechanism will be inoperative, when the wagon is traveling from place to place, the spring 40 may be pressed at its free end toward the wheel 35, so as to pass the outer end of the member 33.

When the shaft 29 is revolved, the agitator member 30 will be revolved with it, as will be the spreader member 18, the latter being revolved through the intermediacy of the gears 28 and 27 and shaft 20.

The material discharged through the opening 12 will fall upon the revolving flaring surface of the spreader member 18, and will be thrown therefrom by centrifugal force, so as to form a sheet on the ground.

If the wind is strong and liable to scatter too widely the spread material, the set screws 21 may be loosened and the spreader member 18 adjusted to a lower position on the shaft 20, after which the nuts 21 are again tightened.

A collar 41 on the outer end of the shaft 29 holds the sprocket wheel 35 on said shaft.

I do not limit my invention to the structure shown and described, as many modifications, within the scope of the appended claim, may be made without departing from the spirit of my invention.

What I claim is:—

In a lime spreader of the kind described, the combination with the bed and two opposite bolster standards of a wagon, said standards having each a hole therethrough, of a hopper having a front mouth portion extending a substantial distance into the rear open end and resting on the bottom and disposed between the sides of said bed, said hopper at its opposite ends having two plates each having a hole alining with the hole of the adjacent standard, two rods respectively extending through the holes of said standards and through the holes in said plates and having threaded rear ends and each having a hook at its forward end engaging the adjacent standard, and two nuts adjustably mounted on the threaded portions respectively of said rods and bearing respectively against the rear sides of said plates.

In testimony whereof I have signed my name to this specification.

CLAUDE D. BOUSMAN.